(12) United States Patent
Wu et al.

(10) Patent No.: US 9,597,708 B2
(45) Date of Patent: Mar. 21, 2017

(54) BOND LAYER FOR A SOLID OXIDE FUEL CELL, AND RELATED PROCESSES AND DEVICES

(75) Inventors: Jian Wu, Schenectady, NY (US); Todd-Michael Striker, Ballston Lake, NY (US); Stephane Renou, Clifton Park, NY (US); Simon William Gaunt, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 2130 days.

(21) Appl. No.: 11/963,308

(22) Filed: Dec. 21, 2007

(65) Prior Publication Data

US 2011/0217616 A1 Sep. 8, 2011

(51) Int. Cl.
| | |
|---|---|
| *H01M 8/00* | (2016.01) |
| *H01M 8/12* | (2016.01) |
| *H01M 8/24* | (2016.01) |
| *B05D 5/12* | (2006.01) |
| *H01B 1/02* | (2006.01) |

(52) U.S. Cl.
CPC ............... *B05D 5/12* (2013.01); *H01B 1/02* (2013.01); *H01M 8/00* (2013.01); *H01M 8/12* (2013.01); *H01M 8/24* (2013.01); *Y02E 60/521* (2013.01); *Y02E 60/525* (2013.01); *Y02P 70/56* (2015.11)

(58) Field of Classification Search
USPC .......................................... 429/465
See application file for complete search history.

(56) References Cited

U.S. PATENT DOCUMENTS

| 6,228,521 B1 | 5/2001 | Kim et al. | |
| 2005/0048356 A1* | 3/2005 | Ihringer et al. | 429/44 |
| 2006/0024547 A1 | 2/2006 | Waldbillig et al. | |
| 2006/0269813 A1* | 11/2006 | Seabaugh et al. | 429/30 |

FOREIGN PATENT DOCUMENTS

WO  2006010260  2/2006

OTHER PUBLICATIONS

H. Uchida, "High Performance Electrode for Medium-Temperature Solid Oxide Fuel Cells", Nov. 2001, J. Electrochem. Soc, vol. 149, A13-A18.*

E. Konysheva, "Influence of different perovskite interlayers on the electrical conductivity between La0.65Sr0.3MnO3 and Fe/Cr-based steels.", Jan. 2006, Solid State Ionics, vol. 177, 923-930.*

H. Uchida et al., "High Performance Electrode; for Medium-Temperature Solid Oxide Fuel Cells," Journal of the Electrochemical Society, vol. 149, (2002), pp. A13-A18.

(Continued)

*Primary Examiner* — Daniel Gatewood
(74) *Attorney, Agent, or Firm* — Francis T. Coppa

(57) ABSTRACT

An electrically-conductive layer of material having a composition comprising lanthanum and strontium is described. The material is characterized by a microstructure having bimodal porosity. Another concept in this disclosure relates to a solid oxide fuel cell attached to at least one cathode interconnect by a cathode bond layer. The bond layer includes a microstructure having bimodal porosity. A fuel cell stack which incorporates at least one of the cathode bond layers is also described herein, along with related processes for forming the cathode bond layer.

11 Claims, 3 Drawing Sheets

(56) References Cited

OTHER PUBLICATIONS

T. J. Armstrong et al., "Anode-Supported Solid Oxide Fuel Cells with $La_{0.4}CoO_3-\lambda Zr_{0.84}Y_{0.16}O_{2-\delta}$ Composite Cathodes Fabricated by an Infiltration Method," Journal of the Electrochemical Society, vol. 153, (2006) pp. A515-A520.

H. U. Anderson et al., "High Temperature solid Oxide Fuel Cells: Fundamentals, Design and Applications," Elsevier Advanced Technology, 2003, p. 173-174 and 187-189.

Y. Akiyama et al., Development of a Planar Solid Oxide Fuel Cell At Sanyo, Power Sources, (1993), pp. 724-731.

D. Das et al., "Chromium Evaporation from SOFC Interconnector Alloys and Degradation Process by Chromium Transport," Proceedings of the 1st European SOFC Forum, ed. U. Bossel, Switzerland, 1994, pp. 703-713.

T. Akiyama et al., "Surface treatment of alloy separator in a planar-type solid oxide fuel cell," Journal of Power Sources, vol. 50, (1994), pp. 361-368.

J. W. Fergus, "Metallic interconnects for solid oxide fuel cells," Elsevier, Materials Science & Engineering, vol. A397, (2005), pp. 271-283.

E. Konysheva et al., "Influence of different perovskite interlayers on the electrical conductivity between $La_{0.65}Sr_{0.3}MnO_3$ and Fe/Cr-based steels," Elsevier, Solid State Ionics, vol. 177, (2006), pp. 923-930.

* cited by examiner

BOND LAYER FOR A SOLID OXIDE FUEL CELL, AND RELATED PROCESSES AND DEVICES

GOVERNMENT RIGHTS

This invention was made with Government support under Contract No. DE-FC26-05NT42614, awarded by the Department of Energy. The U.S. Government has certain rights in this invention.

BACKGROUND OF THE INVENTION

The invention generally relates to fuel cell technology. More particularly, some embodiments are directed to bond layers used to join various structures in solid oxide fuel cells.

Solid oxide fuel cells (SOFC's) are promising devices for producing electrical energy from a fuel, with high efficiency and low emissions. Solid oxide fuel cells rely on electrodes, electrolytes, and various other features and structures which are capable of withstanding operation at high temperatures (e.g., about 800° C.). In view of considerable material- and fabrication costs, solid oxide fuel cells require relatively large cell structures; as well as high power densities and fuel utilization levels, to make the technology economically feasible. Multiple factors influence the overall performance of solid oxide fuel cells and fuel cell stacks. These include electrolyte ohmic resistance, electrode polarization, mass transport limits, and the contact resistance at various interfaces in the devices.

As is known in the art, a single fuel cell is based on a sequential structure which includes an anode, a cathode, and an intervening electrolyte. Commercial solid oxide fuel cell structures usually consist of many of these cells stacked together—sometimes hundreds of cells, which cumulatively provide enough voltage to make the device commercially feasible. The cells are typically joined together by interconnects, which are usually in the form of metallic or ceramic layers. The interconnects provide electrical contact, current distribution, and structural integrity between individual cells.

In a typical cathode-electrolyte-anode stack arrangement (viewed vertically for the sake of discussion), one interconnect layer is attached to an upper surface of a cathode layer, for connection to the anode layer of an adjacent cell or "module". Another interconnect layer is attached to the lower surface of the anode, for connection to the cathode layer of another adjacent cell. In view of the fact that interconnects may be exposed to both the oxidizing and reducing side of the cells at high temperatures, they must be extremely stable. For this reason, ceramics have typically been the best choice for long term use, as compared to metals.

Solid interconnects may not always allow optimum performance in a solid oxide fuel cell. As an example, the solid interconnect layer may become warped or otherwise deformed, due to high temperatures, temperature cycling, coefficient-of-thermal-expansion (CTE) differences, and the like. In these cases, the interconnect may not firmly and completely contact the adjacent electrode, leading to variable or insufficient electrical contact through the cell.

One means of addressing the drawbacks of solid interconnects involves the use of a bond paste or bond layer, as described, for example, in U.S. Pat. No. 6,949,307. The bond layer is typically a porous, electronic-conducting ceramic layer. It can be formed on or applied to the surface of the electrode (e.g., a cathode); to the facing surface of the interconnect, or in both locations. The bond layer improves electrical contact between the interconnect and the adjacent electrode. The bond layer can also improve the dimensional tolerance between the interconnect and the electrode, and thereby enhance the physical integrity of the solid oxide fuel cell stack.

As in the case of the other layers and structures in the solid oxide fuel cell, the characteristics of the cathode bond layer affect cell performance. As alluded to above, the bond layer permits the transport of oxygen from the air source for the fuel cell, to the cathode-electrolyte interface. The bond layer also functions to transport electrons from the outer circuit to the cathode-electrolyte interface.

Thus, in order to carry out its intended function, the cathode bond layer must be formed of a material which provides a desired level of oxygen mass transport and electrical conductivity under fuel cell operating conditions. The bond layer must also be chemically and physically stable under those conditions, and must not contain constituents which would adversely react with other cell components.

It may also be desirable for the cathode bond layer to exhibit a relatively high degree of mechanical strength. In most instances, the bond layer should also have thermal expansion characteristics which are compatible with those of the other fuel cell components, e.g., the cathode and adjacent interconnect. In view of the continuing interest and developments in solid oxide fuel cells, cathode bond layers which exhibit improvements in some or all of these properties would be welcome in the art.

BRIEF DESCRIPTION OF THE INVENTION

One embodiment of the present invention is directed to an electrically-conductive layer of material having a composition comprising lanthanum and strontium, and characterized by a microstructure having bimodal porosity.

Another embodiment encompasses a solid oxide fuel cell attached to at least one cathode interconnect by a cathode bond layer, wherein the bond layer comprises a microstructure having bimodal porosity. A fuel cell stack which incorporates at least one of the cathode bond layers is also described herein.

Another embodiment relates to a method for the formation of a cathode bond layer for a solid oxide fuel cell. The method comprises the following steps:

(a) combining a cathode bond paste material with at least one solvent and at least one pore-forming agent, to form a bond paste mixture; wherein the cathode bond paste material comprises particles having an average particle size in the range of about 0.1 micron to about 0.4 micron;

(b) applying the bond paste mixture to a substrate; and (c) heat-treating the applied bond paste mixture at a temperature of at least about 650° C., so as to remove substantially all volatile content from the mixture, and to cause the formation of a microstructure having bimodal porosity, with a total porosity of at least about 50 volume %.

These and other embodiments and features of the invention will become better understood with reference to the following drawings, description, and claims.

DETAILED DESCRIPTION OF THE INVENTION

Figure 1:
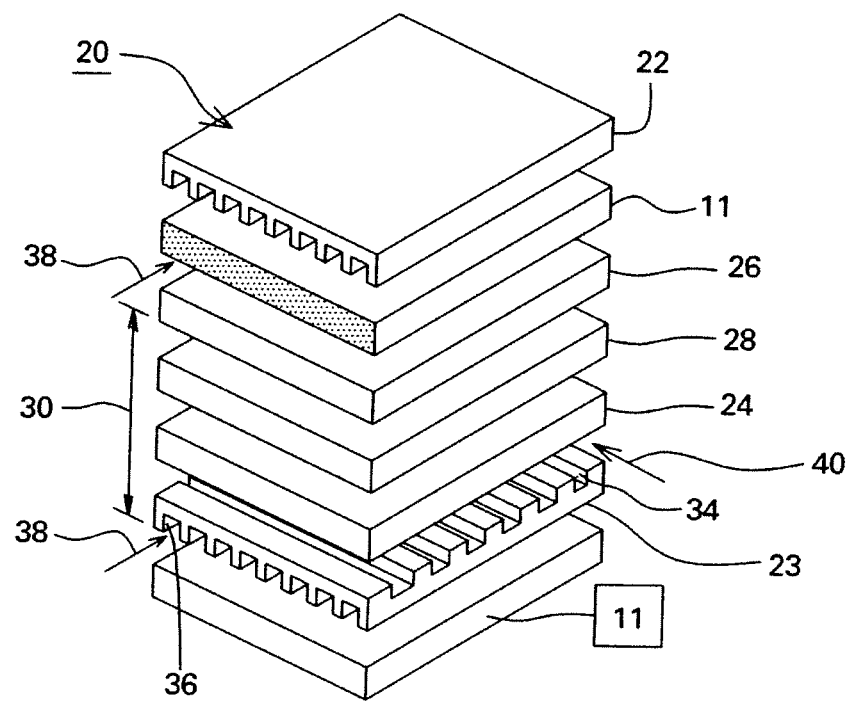
FIG. 1 is a schematic view of a solid oxide fuel cell, comprising a cathode bond layer, according to one embodiment of the present invention.

In the following description, like reference characters designate like or corresponding parts throughout the several views shown in the figures. It is also understood that terms such as "top," "bottom," "outward," "inward," "first," "second," and the like are words of convenience, and are not to be construed as limiting terms. Moreover, as used throughout this disclosure, the terms "a" and "an" do not denote a limitation of quantity, but rather denote the presence of at least one of the referenced items. The suffix "(s)" as used herein is intended to include both the singular and the plural of the term that it modifies, thereby including one or more of that term (e.g., the "layer" may include one or more layers).

As mentioned above, the cathode bond layer is typically situated between a cathode interconnect and the cathode in a solid oxide fuel cell. The bond layer provides electrical contact between the interconnect and the cathode, and can also enhance the physical integrity of the overall fuel cell structure. The composition of the cathode bond layer will depend on a variety of factors, such as the composition of the cathode itself; the electrical-conduction requirements of the fuel cell; the type of interconnect layer being employed, the required bonding strength of the material; the thermal requirements for the fuel cell; and the chemical compatibility of the materials in adjacent layers.

In many cases, the bond layer is formed from a composition similar to that of the cathode itself. In some specific embodiments, the bond layer comprises one or more electronic-conducting ceramic materials, e.g., materials having a perovskite structure. Specific, non-limiting examples of suitable materials for the bond layer are as follows: $La_{1-x}Sr_xMnO_{3-\delta}$ (LSM), $La_{1-x}Sr_xCoO_{3-\delta}$ (LSC), $La_{1-x}Sr_xFeO_{3-\delta}$ (LSF), $La_{1-x}Sr_xCo_{1-y}Fe_yO_{3-\delta}$ (LSCF); $SrFe_{0.5}Co_{0.5}O_{3-\delta}$, $SrCo_{0.8}Fe_{0.2}O_{3-\delta}$; $La_{0.8}Sr_{0.2}Co_{0.8}Ni_{0.2}O_{3-\delta}$, $La_{0.7}Sr_{0.3}Fe_{0.8}Ni_{0.2}O_{3-\delta}$, $La_{1-x}M_xCrO_{3-\delta}$, where "M"=Mg, Ca, Sr, or combinations thereof; and $LaCr_{1-x}M^o{}_xO_{3-\delta}$, where "M$^o$"=Co, Ni, Al, Fe; lanthanum chromate ($LaCrO_3$); lanthanum manganate ($LaMnO_3$); or various combinations thereof. In the relevant formulae, the subscripts "x" and "y" may independently range from 0.99 to about 0.01. In some embodiments, the preferred cathode bond compositions comprise the LSC or LSM materials. (Those skilled in the art understand that the relative proportions of elements in LSC or LSM may vary to some degree).

In most embodiments, the average particle size of the material forming the cathode bond composition is at least about 0.1 micron. In some specific embodiments the particle size is at least about 0.2 micron, and could be as high as about 2 microns. (In many instances, the relatively large particle sizes within this range desirably contribute to increased pore size in the fired bond layer). A preferred range for particle size in some embodiments is about 0.1 micron to about 0.4 micron. The most appropriate particle size will depend in part on the specific bond layer constituents.

As mentioned above, the cathode bond layer comprises a microstructure having bimodal porosity. As used herein, "bimodal porosity" refers to the presence of two phases of pores, wherein the size of the pores in each phase is very different from that of the other phase. In one exemplary embodiment, "bimodal porosity" can comprise a matrix of micropores and macropores. In some specific embodiments, substantially all of the micropores and macropores are interconnected with other micropores or macropores.

The micropores are usually substantially spherical, and typically have an average pore diameter (pore size) no greater than about 1 micron, e.g., in the range of about 0.1 micron to about 0.3 micron. The macropores may be present in different shapes, depending in part on the type of pore former employed. In some instances, the macropores may be substantially spherical (though often with irregular edges). In other cases, the macropores are substantially elongate, e.g., when a pore-former like graphite is employed.

The pore diameter of the macropores depends in part on their particular shape. ("Pore diameter" refers to the largest dimension of the pore in this instance). Usually, the macropores have an average pore diameter of at least about 2 microns, and up to about 50 microns. In some specific embodiments, the range is about 2 microns to about 25 microns In those embodiments in which the macropores are substantially spherical, e.g., when the bond material has been modified with rice starch, the average pore diameter is in the range of about 2 microns to about 15 microns. In those instances in which the macropores are substantially elongate, their aspect ratio is usually in the range of about 1:32 to about 1:2. In some specific embodiments, the aspect ratio of the substantially elongate macropores is in the range of about 1:20 to about 1:4.

The overall porosity of the cathode bond layer (i.e., including microporosity and macroporosity) is usually at least about 50 volume %. In some instances, the overall porosity is at least about 55 volume %. In certain embodiments, the overall porosity is at least about 60 volume %. These levels of porosity are generally higher than the porosity of a typical cathode bond layer formed from materials like LSC or LSM (approximately 40-45 volume %). It is believed that the higher overall porosity of the microstructure, along with its bimodal nature, significantly increases oxygen mass transport through the bond layer, i.e., increasing layer permeability.

Several different techniques are available for preparing and applying the cathode bond layer. In some cases, a bond paste powder commercially prepared from the desired constituents is employed. Such materials are readily available, in a variety of different grades, based on powder-type, particle size, and the like. Examples of commercial suppliers include NexTech Materials, Ltd., Lewis Center, Ohio; and Praxair, Inc., Danbury, Conn. Alternatively, the bond paste powder can be prepared by those skilled in the art, as part of the overall process to make the fuel cell or individual fuel cell components. (As used herein, "bond paste" refers to the combination of some or all of the raw materials which will eventually constitute the bond layer, prior to further processing).

In some cases, it may be desirable to increase the size of the bond paste particles, as discussed previously. Conventional techniques can be undertaken for this purpose. As one example, the bond paste powder could be coarsened by a heating or sintering process. The sintering step functions in part to agglomerate the bond paste particles. Sintering for this purpose is usually carried out at a temperature which is at least about 100° C. above the operational temperature for the fuel cell. In the case of materials such as LSM or LSC, the sintering temperature is usually at least about 900° C. The coarsening step is often effective for increasing the size of very fine nano-scale particles. In this manner, larger particles can be used (e.g., those larger than about 10 microns in diameter), under a different set of processing conditions, e.g., under different milling parameters.

The bond paste powder (sized accordingly) can then be combined with at least one solvent and a pore-forming agent. The particular sequence for the combination is not critical. Moreover, a variety of solvents (e.g., carriers) can be used, depending on various factors, such as the specific type of bond coat constituents. Non-limiting examples of suitable solvents include terpineol, mineral oil, toluene, acetone, ethanol, isopropanol, ethylene glycol, and water. Other additives may also be used, e.g., various surfactants, or binders (such as ethyl cellulose).

A variety of pore-forming agents can be used, with the proviso that they are able to provide the bond layer microstructure described herein. Many of the pore-forming agents are organic materials that vaporize below a fuel cell operating temperature of about 700° C. Non-limiting examples of the pore-forming agents are as follows: starches, cellulosic materials, graphite, carbon black, polymeric particles, and various combinations thereof.

Examples of the starches include rice starch, wheat starch, potato starch, and corn starch. Examples of the polymeric materials (often in particulate form) include polypropylene waxes, polyamides, latexes, polytetrafluoroethylene, and polystyrene, e.g., polystyrene spheres. In some embodiments, starches such as rice starch are preferred when substantially spherical macropores are desired. In other embodiments, graphite fibers are preferred when substantially elongate macropores are desired.

The amount of solvent employed will depend in part on the type of bond paste material. Usually, the amount of solvent is sufficient to provide a slurry viscosity appropriate for a specific, conventional application technique, e.g., screen-printing or painting. Moreover, the amount of pore-former employed will depend on various factors, such as the required total porosity (as discussed herein) for the bond layer in a given end use application. Higher amounts of solvent may be required to compensate for higher viscosities when a larger amount of pore former is used. Conventional methods can be used to combine the constituents, e.g., stirring, shaking, static mixing, milling, or similar techniques.

The cathode bond layer material can be incorporated into the fuel cell structure by a number of conventional techniques. The material (in paste or slurry form) can be applied to the surface of the cathode layer; or to the surface of a cathode interconnect which faces the cathode surface. Alternatively, the cathode bond layer material can be deposited on both surfaces. The material can be applied by spreading, flowing, or other manual techniques. Spray techniques could also be used in some instances, e.g., using a conventional air spray device. Those skilled in the art will be familiar with the most appropriate method of incorporating the cathode bond layer material, based in part on the other processes being employed to fabricate the fuel cell and fuel cell stack.

After being applied to one or more of the selected surfaces, the bond layer material is heat-treated at a temperature of at least about 650° C. The heat treatment functions in part to remove substantially all volatile content from the material, including pore-formers, and to cause the formation of the desired microstructure. The heat-treatment also provides the bond layer with some strength and electrical conductivity, and may also result in some "necking" of the bond layer particles. (Sometimes, this type of heat-treatment is referred to as "sintering", although in a technical sense, sintering temperatures are usually much higher, and result in significant consolidation and densification of the bond particles). The most appropriate heat-treatment temperature will depend in part on the thickness of the bond layer, and on its specific composition, as well as that of the cathode itself. In some specific embodiments, the heat treatment is carried out at a temperature of at least about 700° C., and often, in the range of about 700° C. to about 900° C. It should also be noted that the heat treatment can sometimes occur as the fuel cell is heated during its initial operation.

Another embodiment of the invention is directed to a solid oxide fuel cell (SOFC). As those in the art understand, a fuel cell is an energy conversion device that produces electricity by electrochemically combining a fuel and an oxidant across an ionic conducting layer. As shown in FIG. 1, an exemplary planar fuel cell 20 comprises a cathode interconnect portion 22, and a pair of electrodes—a cathode 26 and an anode 24. The cathode and the anode are separated by a ceramic electrolyte 28. In general, this cell arrangement is well-known in the art, although the configuration depicted in the figure may be modified, e.g., with the anode layer above the electrolyte, and the cathode layer below the electrolyte. Those skilled in the art understand that fuel cells may operate horizontally, vertically, or in any orientation. (Moreover, the thickness of the various layers in the figure is not necessarily to-scale; for ease-of-viewing).

As shown in FIG. 1, cathode bond layer 11 is disposed between interconnect 22 and cathode 26. The bond layer can be formed and applied as discussed previously. The thickness of the cathode bond layer will depend on a number of factors. These include: the size and design of the solid oxide fuel cell; its projected field of use and thermal exposure; the electrical conductivity and oxide transport requirements for the bond layer; its particular composition; as well as bond strength and thermal expansion considerations. As an example, a cathode bond layer which is too thick in a given situation may inhibit the passage of oxygen ions. A cathode layer which is too thin may not provide enough electrical and mechanical contact between the interconnect and the cathode. The cathode bond layer can have a thickness (after the heat treatment) of up to about 1000 microns. Usually, the thickness of the layer is in the range of about 25 microns to about 400 microns. In some specific embodiments, the cathode bond layer has a thickness in the range of about 100 microns to about 300 microns.

Interconnect portion 22 defines a plurality of airflow channels 36 in intimate contact with the cathode 26, while interconnect portion 23 defines a plurality of fuel flow channels 34 in intimate contact with the anode 24. In operation, a fuel flow 40 is supplied to the fuel flow channels 34. An airflow 38, typically heated air, is supplied to the airflow channels 36. The interconnect portion 22 may be constructed in a variety of designs, and with a variety of materials. Typically, the interconnect is made of a good electrical conductor such as a metal or a metal alloy. The interconnect desirably provides optimized contact area with the electrodes. FIG. 1 also depicts the fuel cell repeat unit 30, upon which a fuel cell stack is based.

The operation of a fuel cell like that depicted in FIG. 1 is known in the art. As a non-limiting example, U.S. patent application Ser. No. 11/565,236, filed on Nov. 30, 2006 for T. Striker et al, describes the general concepts involved in the operation of a solid oxide fuel cell. U.S. Pat. No. 6,949,307 (Cable et al) and U.S. Pat. No. 6,296,962 (Minh) are also instructive. All of these patents and patent applications are incorporated herein by reference. In general, a fuel, such as natural gas, is fed to an anode, where it undergoes an oxidation reaction. The fuel at the anode reacts with oxygen ions ($O^{2-}$) transported to the anode across the electrolyte. The oxygen ions are de-ionized to release electrons to an external electric circuit. As part of the fuel cell scheme, air is fed to the cathode. As the cathode accepts electrons from the external circuit, a reduction reaction occurs. The electrolyte conducts ions between the anode and the cathode. The electron flow produces direct current electricity, and the process produces heat and certain exhaust gases and liquids, e.g., water or carbon dioxide.

In the exemplary embodiment shown in FIG. 1, the fuel cell assembly 20 comprises a plurality of repeating units 30, having a planar configuration. Multiple cells of this type may be provided in a single structure. The structure may be referred to as a "stack", an "assembly", or a collection of cells capable of producing a single voltage output.

EXAMPLES

The examples which follow are merely illustrative, and should not be construed to be any sort of limitation on the scope of the claimed invention.

Example 1

Modification of a Cathode Bond Layer Material

An LSC (lanthanum strontium cobaltite) material from Praxair Specialty Ceramics Inc was used in this example. The material had a powder surface area (initial) of 3-5 m2/g. The average particle size, as reported by the vendor, was 0.5 micron. (This size is larger than that observed by SEM for the present invention. The difference may be due to different characterization techniques. For example, the vendor-analysis may have considered some of the agglomerated particles as a single particle).

About 40 g of the LSC powder was coarsened by heating at 900° C. for 2 hours, thereby increasing the average particle size of the material to about 10-100 microns. (Some of the larger particles obtained after coarsening became agglomerated, and were subsequently reduced to smaller particles during a milling step. The actual size of the final particles was still in the submicron-micron range).

One portion of the coarsened powder was then mixed homogeneously with the pore former, rice starch. The rice starch material was a product of Alfa Aesar, 325 mesh size, grade #40798. The ratio of powder to pore-former (solids, weight %) was about 4:1. Another portion of the coarsened powder was mixed homogeneously with graphite powder (the pore former). The commercial graphite used was EM Science's 5X0925-3. The ratio of powder to pore-former (solids, weight %) was about 3.3:1. For each sample, the mixed powder was then added to a solvent (2 wt % ethyl cellulose in terpineol). The mixture was stirred, and then milled with a three-roll mill, to break up the agglomerates.

Each sample of bond material was then applied to a fuel cell between the cathode and the metallic interconnect. The fuel cell was then heated at a temperature of 800° C. for 2 hours. The heat treatment burned off the solvent, and "necked" adjacent particles. The same procedure was undertaken for the LSC bond paste itself, without the addition of any pore former, or any other modification of the material. (The weight-ratio of solids loading, with or without pore former, to solvent was maintained at about 70:30.)

Figure 2:
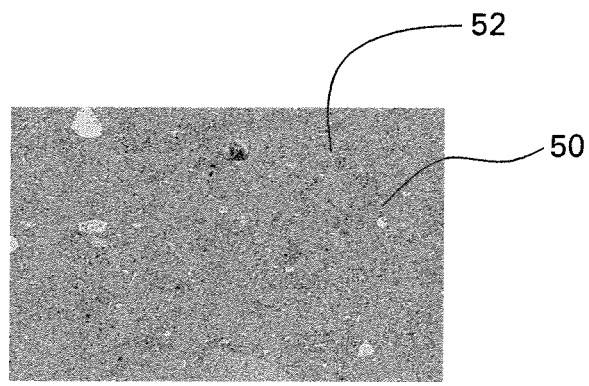
FIG. 2 is a scanning electron microscope image of a conventional lanthanum-strontium-cobalt bond layer material after heat treatment.
Figure 3:
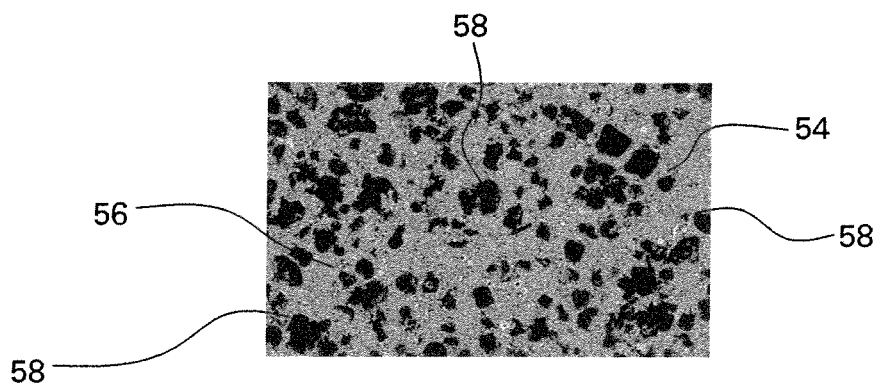
FIG. 3 is a scanning electron microscope image of a modified lanthanum-strontium-cobalt bond layer material after heat treatment, according to one embodiment of the invention.
Figure 4:
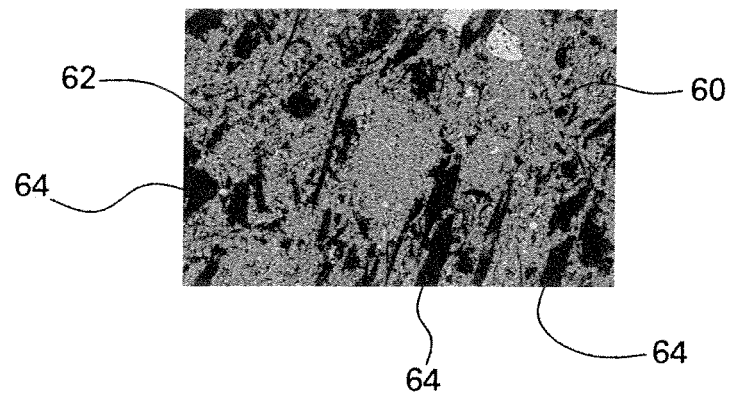
FIG. 4 is a scanning electron microscope image of a modified lanthanum-strontium-cobalt bond layer material after heat treatment, according to another embodiment of the invention.

FIGS. 2-4 are backscattered SEM (scanning electron microscope) images of samples for this example. FIG. 2 represents the base line, LSC bond layer material, showing a microstructure 50 having a single phase (i.e., not bimodal) of porosity. The porosity 52 is microporous, with an average pore size in the range of about 0.1-0.3 micron. The total porosity of the LSC bond layer material is about 40-45 volume %. Moreover, the porosity is substantially interconnected.

FIG. 3 represents a modified bond layer material, according to one embodiment of the invention, with the addition of rice starch, and with an associated heating treatment. The figure clearly shows a microstructure 54 with bimodal porosity. The microstructure depicts a matrix 56 of interconnected micropores, having an average pore size similar to that of the material of FIG. 2. A plurality of macropores 58 are also present in the matrix. The macropores have an average pore size in the range of about 2-15 microns. (Although not readily apparent in a 2-dimensional depiction like that of FIG. 3, substantially all of the macropores are also interconnected with the overall pore structure). The total porosity of the bond layer microstructure 54 (per unit volume) was in the range of about 60 to 65 volume percent.

FIG. 4 represents a modified bond layer material, according to another embodiment of the invention, with the addition of graphite, and with an associated heating treatment. This figure also shows a microstructure 60 with bimodal porosity. The microstructure depicts a continuous matrix 62 of interconnected micropores, having an average pore size similar to that of the micropores in the other two figures.

A plurality of macropores 64 is also present in FIG. 4. (As in the case of FIG. 3, substantially all of the macropores are also interconnected with the overall pore structure). In this instance, the macropores are generally elongate in shape. The macropores have an average pore size in the range of about 2-15 microns. The aspect ratio of the elongate macropores is in the range of about 1:20 to about 1:4. The total porosity of the bond layer microstructure 60 (per unit volume) was in the range of about 60 to 65 volume percent.

The gas permeability of the various cathode bond layers in Example 1 was measured. The results are listed in Table 1, along with the measurement of a standard, stainless steel foam substrate. (The substrate functions as a porous support layer. Its permeability is accounted for in determining the permeability of the bond layers themselves). All of the results were obtained after the 800° C. heat treatment. Air was used for the permeability measurements, which were taken at room temperature.

TABLE 1

| Sample | Description | Thickness (microns) | Permeability Average[a] | Permeability Std. Dev.[a] |
|---|---|---|---|---|
| A | Stainless Steel Foam | 537 | 0.067 | 0.0062 |
| B | LSC Bond Layer | 76 | 0.00057 | 0.00013 |
| C | Modified Bond Layer (Rice Starch) | 144 | 0.013 | 0.00087 |
| D | Modified Bond Layer (Graphite) | 169 | 0.012 | 0.0014 |

[a]Darcy units; Std. Dev. = Standard Deviation

The data of Table 1 demonstrate the relatively high gas permeability of the modified bond layers (Samples C and D), as compared to the base-line bond paste material (Sample B). The high permeability values can increase power density in a fuel cell.

Example 2

SOFC Performance, Using Samples with the Modified Cathode Bond Layer Microstructure A number of samples were evaluated for several fuel cell performance characteristics. The samples were based on the material in Example 1, i.e., the base-line LSC bond paste; along with the samples modified with rice starch or graphite. For each sample, the same amount of LSC loading (solids) was used. The test employed one inch cells, with gold mesh as a cathode side current collector. The test was run at 97% hydrogen, 2% $H_2O$, and 800° C., with a constant voltage of 0.7V.

Figure 5:
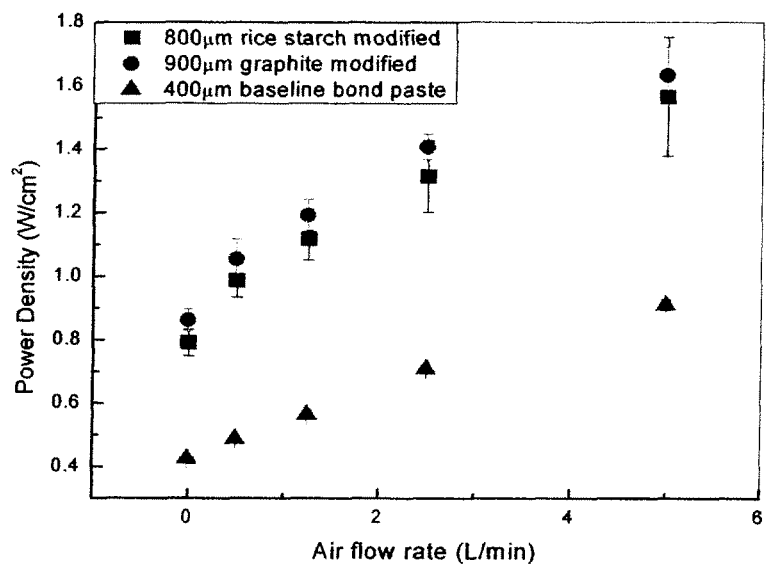
FIG. 5 is a plot of fuel cell performance for a set of samples, depicting power density as a function of air flow rate under certain conditions.

The results of the tests are shown in FIG. 5. The figure graphically depicts power density ($W/cm^2$) as a function of air flow rate (L/min). It can readily be seen that the modified samples exhibited a much higher power density as compared to the base-line material, presumably due to higher oxygen flow rates to the cathode. As alluded to above, the higher power density is often a clear predictor of higher fuel cell performance. In this instance, the higher power density was especially surprising, in view of the fact that the cathode bond layer was approximately twice as thick as that of the baseline layer.

Example 3

SOFC Performance, Using Samples with the Modified Cathode Bond Layer Microstructure, for Large-Scale Cell Configuration Multiple samples based on the materials in Example 1 (base-line LSC paste and rich starch-modified paste) were again tested for performance. In this instance, an E-Brite® stainless steel section was used as the cathode side current collector, rather than the gold collector in Example 2. The E-Brite material is more typical of collectors used in conventional SOFC stack devices.

Figure 6:
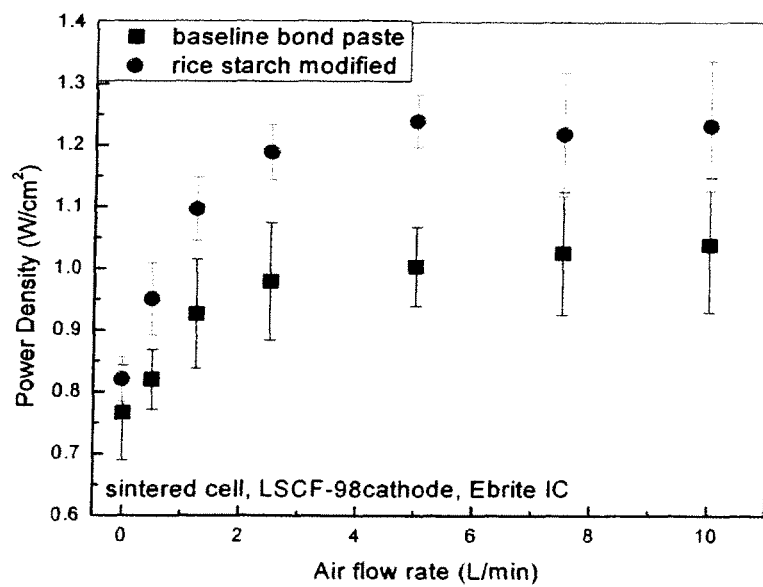
FIG. 6 is a another plot of fuel cell performance, depicting power density as a function of air flow rate under certain conditions.

The tests were carried out as in Example 2. The results are shown in FIG. 6, in which power density ($W/cm^2$) is again expressed as a function of air flow rate. The data on which the figure is based again demonstrate the higher performance of the modified bond layer, as compared to the base-line material.

While this invention has been described in detail, with reference to specific embodiments, it will be apparent to those of ordinary skill in this area of technology that other modifications of this invention (beyond those specifically described herein) may be made, without departing from the spirit of the invention. Accordingly, the modifications contemplated by those skilled in the art should be considered to be within the scope of this invention. Furthermore, all of the patents, patent publications, articles, texts, and other references mentioned above are incorporated herein by reference.

What is claimed is:

1. A solid oxide fuel cell attached to at least one cathode interconnect by a cathode bond layer, wherein the bond layer comprises a micro structure having bimodal porosity and a total porosity and a matrix of interconnected micropores and macropores, wherein the micropores have an average pore diameter of about 0.1 micron to about 0.3 micron and wherein the macropores have an average pore diameter of at least about 2 microns and an aspect ratio of about 1:32 to about 1:2 wherein the fuel cell has an improved air flow rate and power density.

2. The solid oxide fuel cell of claim 1, wherein the total porosity of the cathode bond layer is at least about 50 volume %.

3. The solid oxide fuel cell of claim 1, wherein the macropores are substantially elongate.

4. The solid oxide fuel cell of claim 2, wherein the total porosity of the cathode bond layer is at least about 55 volume %.

5. The solid oxide fuel cell of claim 1, wherein the cathode bond layer is disposed between a cathode interconnect and a cathode.

6. The solid oxide fuel cell of claim 1, wherein the cathode bond layer comprises bond layer material particles having an average particle size in the range of about 0.1 micron to about 0.4 micron.

7. The solid oxide fuel cell of claim 1, wherein the cathode bond layer comprises a material having a perovskite structure.

8. The solid oxide fuel cell of claim 1, wherein the cathode bond layer comprises at least one material selected from the group consisting of $La_{1-x}Sr_xMnO_{3-\partial}$ (LSM), $La_{1-x}Sr_xCoO_{3-\partial}$ (LSC), $La_{1-x}Sr_xFeO_{3-\partial}$ (LSF), $La_{1-x}Sr_xCo_{1-y}Fe_yO_{3-\partial}$ (LSCF); $SrFe_{0.5}Cu_{0.5}O_{3-\partial}$, $SrCo_{0.8}Fe_{0.2}O_{3-\partial}$; $La_{0.8}Sr_{0.2}Co_{0.8}Ni_{0.2}O_{3-\partial}$; $La_{0.7}Sr_{0.3}Fe_{0.8}Ni_{0.2}O_{3-\partial}$, $La_{1-x}M_xCrO_{3-\partial}$, where "M"=Mg, Ca, Sr, or combinations thereof; and $La Cr_{1-x}M°_xO_{3-\partial}$, where "M°"=Co, Ni, Al, Fe, or combinations thereof; $LaCrO_3$; and $LaMnO_3$, wherein "x" and "y" independently range from 0.99 to about 0.01.

9. The solid oxide fuel cell of claim 1, wherein the fuel cell comprises an anode, a cathode, and a ceramic electrolyte disposed between the anode and the cathode.

10. A solid oxide fuel cell stack, comprising a plurality of solid oxide fuel cells attached to each other, wherein a cathode bond layer connects a cathode interconnect to a cathode for each adjacent fuel cell; and said cathode bond layer comprises a microstructure having bimodal porosity and a matrix of interconnected micropores and macropores, wherein the micropores have an average pore diameter of about 0.1 micron to about 0.3 micron and wherein the macropores have an average pore diameter of at least about 2 microns and an aspect ratio of about 1:32 to about 1:2.

11. The solid oxide fuel cell of claim 1 wherein the macropores have an average pore diameter of about 2 microns to 15 microns.

* * * * *